United States Patent
Knight

(10) Patent No.: US 9,226,000 B1
(45) Date of Patent: Dec. 29, 2015

(54) CONTENT DISTRIBUTION SYSTEM AND METHOD

(71) Applicant: Keith R. Knight, Ladera Ranch, CA (US)

(72) Inventor: Keith R. Knight, Ladera Ranch, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/483,311

(22) Filed: Sep. 11, 2014

(51) Int. Cl.
| | |
|---|---|
| H04N 7/18 | (2006.01) |
| H04N 21/214 | (2011.01) |
| H04N 21/218 | (2011.01) |
| H04N 21/231 | (2011.01) |
| H04N 21/235 | (2011.01) |
| H04N 21/242 | (2011.01) |
| H04N 21/6405 | (2011.01) |

(52) U.S. Cl.
CPC ....... H04N 21/2146 (2013.01); H04N 21/2181 (2013.01); H04N 21/231 (2013.01); H04N 21/235 (2013.01); H04N 21/23113 (2013.01); H04N 21/242 (2013.01); H04N 21/6405 (2013.01)

(58) Field of Classification Search
CPC ............ H04N 21/2146; H04N 21/231; H04N 21/2181; H04N 21/235; H04N 21/23113; H04N 21/242; H04N 21/6405
USPC ....................................................... 725/76, 77
See application file for complete search history.

(56) References Cited

U.S. PATENT DOCUMENTS

| | | | |
|---|---|---|---|
| 6,240,414 B1* | 5/2001 | Beizer et al. | |
| 7,127,477 B2* | 10/2006 | Duncombe | G06F 21/606 707/610 |
| 7,765,186 B1* | 7/2010 | Hu | G06F 17/30578 707/612 |
| 7,836,472 B2* | 11/2010 | Brady et al. | 725/76 |
| 7,984,190 B2* | 7/2011 | Rhoads | 709/248 |
| 8,176,363 B2* | 5/2012 | Zlotnick | 714/13 |
| 2006/0174285 A1* | 8/2006 | Brady et al. | 725/76 |
| 2007/0106771 A1* | 5/2007 | Lucash et al. | 709/223 |
| 2007/0250873 A1* | 10/2007 | Ohyama et al. | 725/82 |
| 2008/0016081 A1* | 1/2008 | MacMillan et al. | 707/10 |
| 2008/0016196 A1* | 1/2008 | MacMillan et al. | 709/223 |
| 2012/0112694 A1* | 5/2012 | Frisch et al. | 320/109 |
| 2014/0059184 A1* | 2/2014 | Bird et al. | 709/219 |
| 2014/0074918 A1* | 3/2014 | Wang et al. | 709/203 |

* cited by examiner

Primary Examiner — Nasser Goodarzi
Assistant Examiner — Michael B Pierorazio
(74) Attorney, Agent, or Firm — Angel N. Gerdzhikov; Donna P. Suchy; Daniel M. Barbieri

(57) ABSTRACT

A content distribution system and or method can be used to align content stored in a remote source with content stored on a plurality of target units and content stored on a head end. A content distribution module can be utilized to distribute content using set logic. The content can include video, audio, graphic, or other files. Content distribution system and method can be used in an in-flight entertainment system that includes a central repository and a number of in-seat entertainment units.

19 Claims, 6 Drawing Sheets

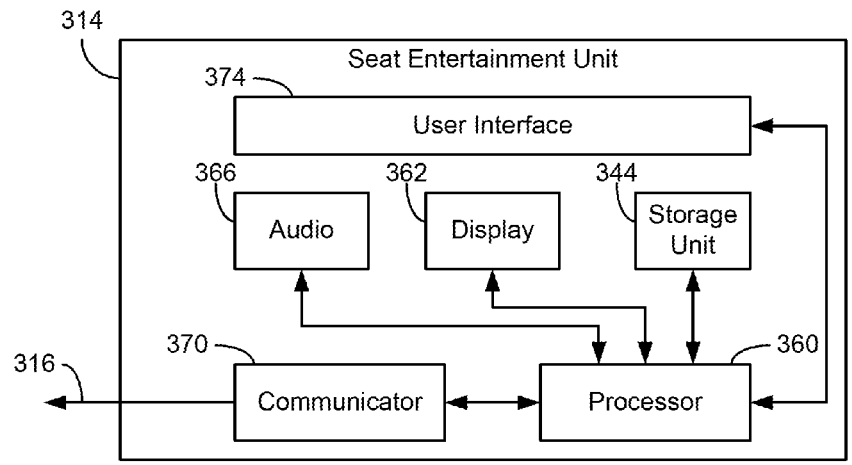
FIG. 4
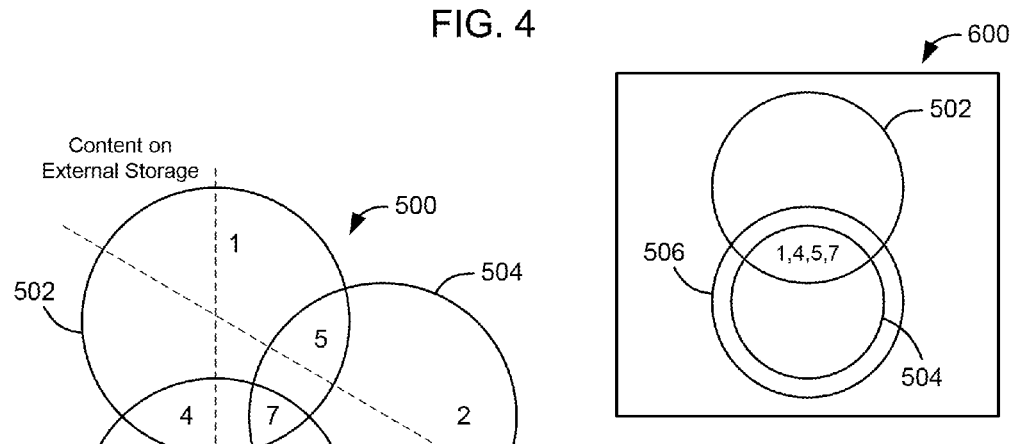
FIG. 5
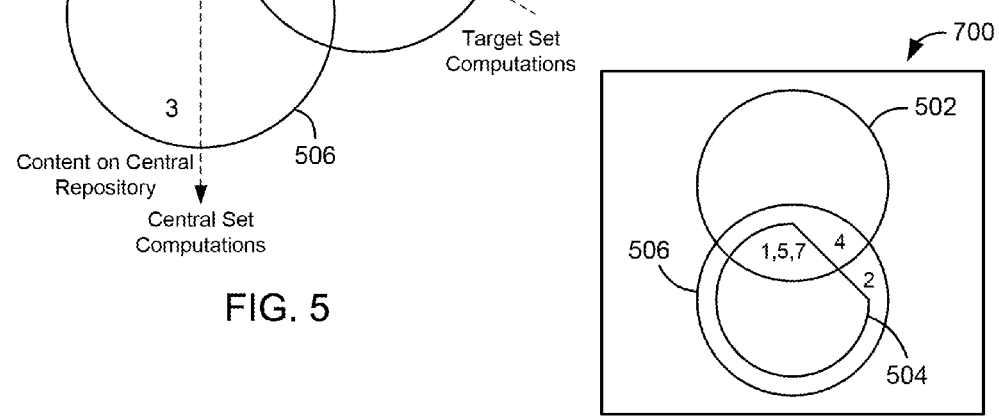
FIG. 6
FIG. 7

CONTENT DISTRIBUTION SYSTEM AND METHOD

BACKGROUND

The present disclosure relates generally to the field of content distribution systems and methods including but not limited to content distribution systems and methods for in-flight or passenger entertainment systems.

Content, such as video content, audio content, menus, schedules, or other graphics, is delivered from a source to a user unit for viewing or listening by a user. For example, a passenger entertainment system can provide a variety of content including but not limited to web pages, entertainment guides, video-on-demand, audio-on-demand, near video-on-demand, and digital audio and video broadcasts to a passenger in a vehicle. The passenger entertainment system, e.g., an in-flight entertainment (IFE) system, can deliver content via some wired or wireless communication networks to entertainment units disposed in the back portion of the passenger seats.

Each entertainment unit at the passenger seats can include a user interface, a video screen, a speaker or headphone jack, and a processing unit. The passengers can select content for viewing or listening via the user interface. The processing unit provides the content to the video screen, speaker, and/or head phone jack.

The content is generally provided from a head end of the network associated with the entertainment units. In conventional systems, distributing content throughout the network can require a significant amount of time, especially when large amounts of content is being made available for consumption by users. Further, ensuring that each user has access to the appropriate content and that all of the appropriate content is available to the user can require additional amounts of significant time in conventional systems.

Thus, there is a need for entertainment systems and methods that provide more efficient distribution of content. Further, there is a need for a content distribution system and method that efficiently delivers content to a seat entertainment unit. Further still, there is a need for an in-flight entertainment system and method that loads content according to an efficient model. There is further a need for a content distribution system and method that allows faster distribution of content. Further still, there is a need for a content distribution system that accurately delivers a set of assets to target units in an efficient manner.

SUMMARY

In one aspect, embodiments of the inventive concepts disclosed here in are directed to a content distribution system for aligning content stored in a remote source with content stored on a number of target units and content stored on a head end. The system includes a memory and a content distribution module. The content distribution module provides content stored on the remote source to the head end and the target units using set logic to ensure that the content stored on the remote source matches the content stored on the head end and the content stored on the target units after distribution. The content distribution module copies first content stored on the remote source to memory; the first content is content not already stored on the head end before distribution. The content distribution module sends the first content to the plurality of target units.

In a further aspect, embodiments of the inventive concepts disclosed herein are directed to an in-flight entertainment system receiving remote content from a remote source. The remote content includes a first asset, a second asset and a third asset. The in-flight entertainment system includes a central repository comprising a router and a first memory. The first memory stores central content comprising the third asset and a fourth asset. The in-seat entertainment system also includes a number of in-seat entertainment units in communication with the router. Each in-seat entertainment unit includes a respective memory. The central repository deletes the fourth asset in response to a comparison of identification of the remote content to identification of the central content, copies the first asset and the second asset to the first memory and provides via the router the first asset and the second asset to the entertainment units for storage in each respective memory.

In a further aspect, embodiments of the inventive concepts disclosed herein are directed to a method of distributing and aligning remote content stored on a remote source with target content stored on a plurality of target units and central content stored on a central repository. The method includes comparing the remote content and the central content, and removing first assets from the central content. The first assets not being part of the remote content. The method also includes adding second assets from the remote content to the head end content, the second assets not being part of the head end content before the adding, and providing the second assets to the target units. In some embodiments, the targets remove the assets from their memory that are not present on the remote content.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

FIG. 4 is block diagram of an exemplary embodiment of a seat entertainment unit for the in-flight entertainment system illustrated in FIG. 1;

FIG. 5 is a Venn diagram representation showing exemplary content for distribution using the exemplary distribution systems illustrated in FIGS. 1-3;

FIG. 6 is a Venn diagram representation showing exemplary aligned content distribution for the exemplary distribution systems illustrated in FIGS. 1-3;

FIG. 7 is a Venn diagram representation showing exemplary non-aligned content distribution;

DETAILED DESCRIPTION OF THE EXEMPLARY EMBODIMENTS

Figure 1:
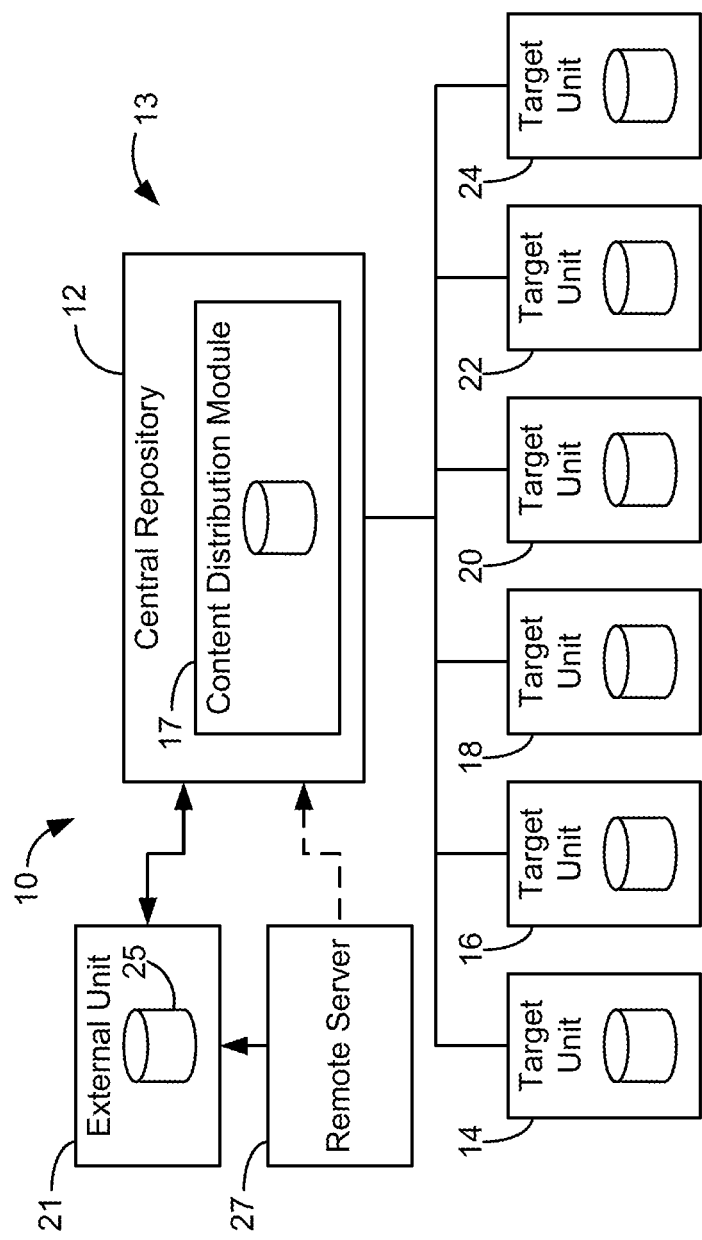
FIG. 1 is a block diagram of a content distribution system according to an exemplary embodiment.

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to some embodiments, a distribution system and method can provide content (e.g., video, graphic, and audio) to target units. The distribution system is for use in an in-flight entertainment system. In some embodiments, the distribution system provides content to be stored at entertainment units at each target (e.g., at each seat). Content includes assets such as video files, audio files, graphic files, portions thereof, combinations thereof, in some embodiments.

The distribution system and method uses set theory to efficiently provide content to target units in some embodiments. In some embodiments, the distribution system and method quickly assimilates the content of the head end and seat units of an in-flight entertainment system to an external storage applying the following rules: 1. do not copy files from the external storage to the in-flight entertainment system that are already resident on the in-flight entertainment system; and 2. delete files from the in-flight entertainment system that do not exist on the external storage. In some embodiments, the distribution system and method distributes a content universe, where each asset in the content universe is given a 32 bit unique asset identification (e.g., addresses identifying 4 billion media items, such as, video and audio). In some embodiments, content metadata is stored as a database file (e.g., metadata.db), where each record contains the unique asset identification and the path to the asset (e.g. path-to-asset). The content metadata is compared using set theory (intersections, unions, and non-intersections) to distribute and align the data in an efficient manner in some embodiments.

With reference to FIG. 1, a content distribution system 10 includes an external storage unit 21 and a network 13. The network 13 includes a central repository 12 and target units 14, 16, 18, 20, 22, and 24. Any number of target units 14, 16, 18, 20, 22 and 24 can be utilized in network 13. The target units 14, 16, 18, 20, 22 and 24 may be seat entertainment units for a vehicle or other units for viewing and/or listening to content. Target units 14, 16, 18, 20, 22 and 24 are handheld units in some embodiments.

The central repository 12 can be a server or any network device for storing and providing content to the target units 14, 16, 18, 20, 22 and 24. The central repository 12 is configured for multicasting and determining the content on the target units 14, 16, 18, 20, 22 and 24. The central repository 12 assumes targets target units 14, 16, 18, 20, 22 and 24 are aligned; only after multicasting the central repository 12 examines each target that is not at 100% aligned according to some embodiments. In some embodiments, central repository 12 is capable of deleting the content on target units 14, 16, 18, 20, 22 and 24; however, the content on target units 14, 16, 18, 20, 22 and 24 can be more efficiently autonomously deleted by target units 14, 16, 18, 20, 22 and 24 in some embodiments.

The central repository 12 can include a content distribution module 17. The central repository 12 serves as a head end controller for ensuring alignment of content on network 13 with content on the external storage unit 21 in some embodiments. The network 13 can operate according to any communication protocol (e.g., Ethernet. WLAN) suitable for transferring assets.

The external storage unit 21 can be any device for communicating with the network 13 and providing content for the network 13. The external storage unit 21 may be directly coupled or wirelessly coupled to head end or the central repository 12. The external storage unit 21 can be coupled through other networks (e.g., the internet), or other devices. The external storage unit 21 includes a database 25 for storing metadata associated with the content for provision to the target units 14, 16, 18, 20, 22 and 24 in the network 13.

The external storage unit 21 can include individual databases for some different networks 13. The content in database 25 of the external storage unit 21 is to be provided on each of the target units 14, 16, 18, 20, 22 and 24 by the system 10. The target units 14, 16, 18, 20, 22 and 24 do not include additional content beyond the content in the database 25 after content distribution due to the operation of the content distribution module 17. The external storage unit 21 can be any computing or storage device including storage for the database 25. The database 25 includes unique asset identifications for each asset to be distributed on the network 13.

The external storage unit 21 may be implemented as a universal serial bus (USB) card containing the database 25 and an appropriate reader. The external storage unit 21 is or includes a USB or secured digital extended capacity (SDXC) non-volatile memory card and can be connected to the central repository 12 via a USB port. Although examples of the external storage unit 21 are disclosed, they are not disclosed in a limiting fashion. Any type of storage unit can be utilized as the external storage unit 21 without departing from the scope of the invention.

In some embodiments, the network 13 does not include the external storage unit 21 and content is provided from a remote server 27 wirelessly or through a wired connection to the central repository 12. The remote server 27 can be any computing or storage device for storing content to be distributed on the network 13 (e.g., a remote in-flight entertainment server). The remote server 27 loads the external storage unit 21 with content for the network 13. In some embodiments, content distribution module 17 can treat central repository 12 as a target unit and execute content distribution module 17 for system 10.

The content distribution module 17 can be software, hardware, or a combination of software and hardware for implementing the operations described with respect to the system 10. In one embodiment, the content distribution module 17 is located on the central repository 12 and target units 14, 16, 18, 20, 22 and 24 and executed as a software module by the processing platforms associated with the central repository 12 and target units 14, 16, 18, 20, 22 and 24. In one embodiment, content distribution module 17 is located on central repository 12 and executed as a software module by the processing platform associated with central repository 12. The content distribution module 17 can be stored on a non-transitory computer medium and include instructions for aligning and routing files or assets among the external storage unit 21 and the remote server 27 and the target units 14, 16, 18, 20, 22 and 24. In some embodiments, the content distribution module 17 is located on other processing platform associated with the network 13 and can be distributed on more than one processing platform.

In some embodiments, the network 13 is configured to assimilate the content identified in the database 25 with the content identified in the target units 14, 16, 18, 20, 22 and 24 and the central repository 12 by their installed database. To assimilate the content of the central repository 12 to the external storage unit 21, set computations are executed using the metadata (e.g., the metadata-new.db/external) associated with database 25 and the metadata on central repository 12 (metadata.db/install) in some embodiments. According to some embodiments, the set computations are utilized to determine the difference between the set of assets located on central repository 12 identified by database 26 and the set of assets identified in the database 25 and are performed by the content distribution module 17. In some embodiments, assets that need to be transferred to the central repository 12 are determined by identifying assets from the database 25 that are already located on the central repository 12 and assets from database 25 that are not located on the central repository 12. In addition, assets that are on the central repository 12 that are not in the database 25 are identified in some embodiments.

Assets that are not on the central repository 12 and are in the database 25 are copied to the central repository 12 while assets in database 25 and already on the central repository 12 are not copied in some embodiments. Assets on the central repository 12 that are not in the database 25 are deleted from the central repository 12 in some embodiments.

The content on each of the target units 14, 16, 18, 20, 22 and 24 is assimilated to the external storage unit 21 using a similar technique in some embodiments. In some embodiments, metadata associated with the database 25 is sent over the network 13 to each of the target units 14, 16, 18, 20, 22 and 24 and compared to the metadata on each of the target units 14, 16, 18, 20, 22 and 24 (e.g., metadata_T1, metadata_T2, . . . metadata_Tn) by the central repository 12 (e.g., by the content distribution module 17). In some embodiments, deletions are done at each of target units 14, 16, 18, 20, 22 and 24 autonomously. After the distribution/multicast phases, target units 14, 16, 18, 20, 22 and 24 are examined by central repository 12 for missing files. In some embodiments, the comparison is performed by each of the target units 14, 16, 18, 20, 22 and 24 and the results are provided to the content distribution module 17. The targets units 14, 16, 18, 20, 22 only delete files and report status in one or more embodiments.

In some embodiments, the assimilation of database 25 to target units 14, 16, 18, 20, 22 and 24 can be performed sequentially or simultaneously with the assimilation of central repository 12. In some embodiments, assets that were copied from database 25 to central repository 12 are multicast to target units 14, 16, 18, 20, 22 and 24 (can be performed sequentially or simultaneously with the copying by central repository 12).

In some embodiments, assets that are on the target units 14, 16, 18, 20, 22 and 24 and not in the database 25 are deleted. In some embodiments, the target units 14, 16, 18, 20, 22, and 24 can delete such assets in response to metadata or in response to a command from the content distribution module 17.

Assets described by database 26 exist on the central repository 12. If those assets do not exist on the external storage unit 21 or remote server 27 described by database 25, they are deleted from the central repository 12. In some embodiments, there are only asset deletions and no asset copying.

The central repository 12 does not send assets that were already on the central repository 12 to the target units 14, 16, 18, 20, 22 and 24. This operation prevents unnecessary sending of assets to target units 14, 16, 18, 20, 22 and 24 as the target units 14, 16, 18, 20, 22 and 24 in most circumstances may have the assets that the central repository 12 possesses and results in assets not being unnecessarily sent according to some embodiments.

After copying of assets from the external storage unit 21 to the central repository 12 and the target units 14, 16, 18, 20, 22 and 24, the network 13 performs a synchronization phase in some embodiments. During the synchronization phase, the content distribution module 17 performs a remote database query on each of the target units 14, 16, 18, 20, 22 and 24 to determine whether all assets have been received by the target units 14, 16, 18, 20, 22 and 24 in some embodiments. When missing assets are identified, the central repository 12 provides missing assets to the target units 14, 16, 18, 20, 22 and 24. A multicast can be utilized to provide the missing assets. Alternatively, a direct communication to the target units 14, 16, 18, 20, 22, and 24 missing the asset can be utilized.

Figure 2:
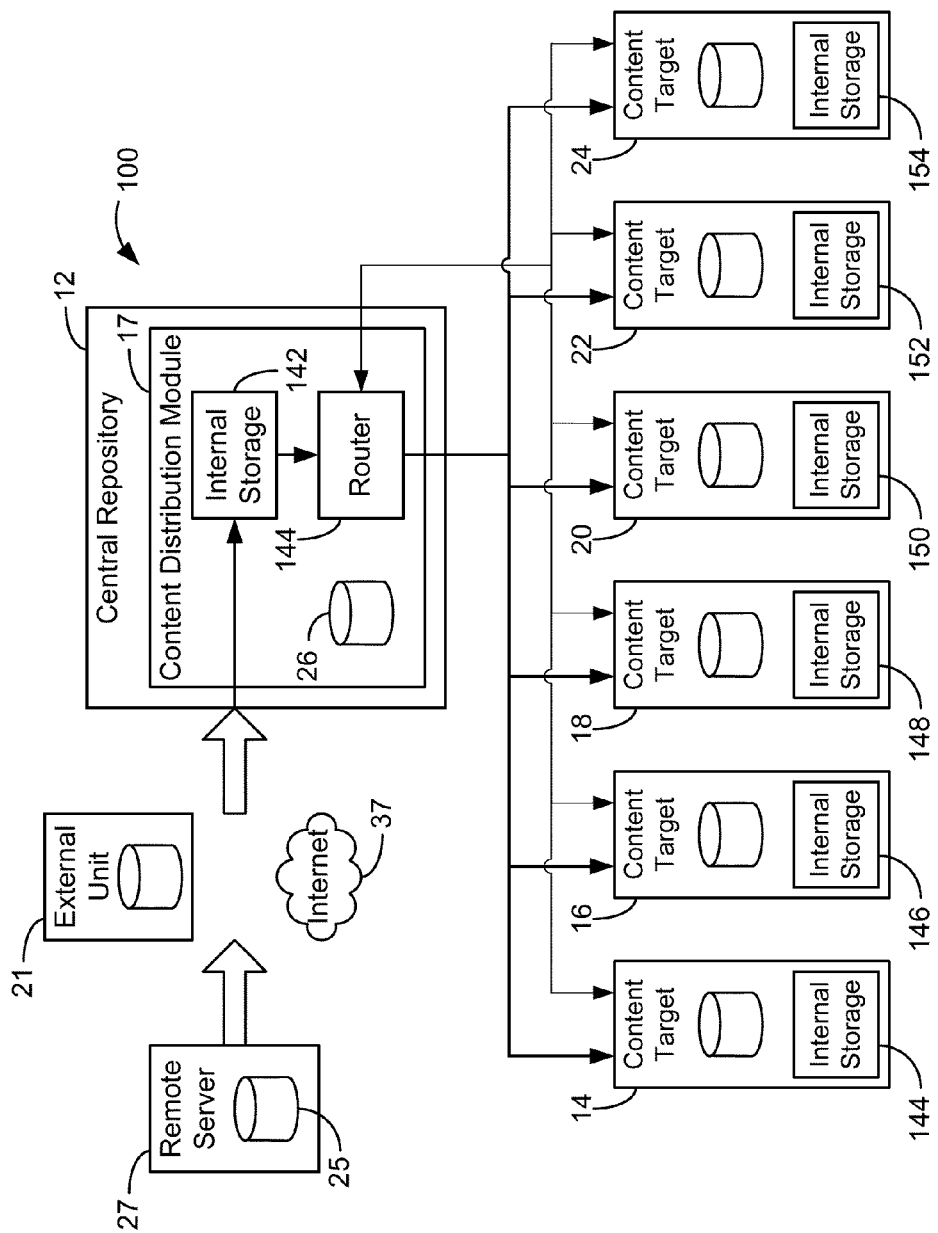
FIG. 2 is a block diagram of a content distribution system according to an exemplary embodiment.

With reference to FIG. 2, a content distribution system 100 is similar to system 10 and can be in communication with a remote server 27 serving as an external storage unit 21 via internet 37. In some embodiments, the remote server 27 is optional and the external storage unit 21, such as a multimedia card, stores a database 25 of asset metadata for distribution to the network 13 via central repository 12. The database 25 (FIG. 1) details the entire content on the external storage unit 21. Content is comprised of a single asset or multiple assets where each asset is a partial or whole file. Assets are identified with a unique asset identification (e.g., universal unique identifier (UUID) and is provided to a head end or central repository 12 in some embodiments.

The central repository 12 includes an internal storage 142 and a router 143 in some embodiments. In some embodiments, the router 143 uses a multicast command to distribute assets received from the external storage unit 21. The multicast command is utilized to provide all assets that are received from the remote server 27 or the external storage unit 21 (e.g. the assets that were in the database 25 and not already in the internal storage 142 on the central repository 12). The router 143 provides database queries and receives answers to database queries via the network 13 for synchronization in some embodiments. In some embodiments, a file transfer command is issued to copy assets from the remote server 27 or the external storage unit 21 to the internal storage 142 and then to perform a simultaneous multicast of those assets to the target units 14, 16, 18, 20, 22, and 24 in some embodiments. In some embodiments, the assets being copied to the central repository 12 are only the assets that were in the database 25 and not also already in central repository 12.

Figure 3:
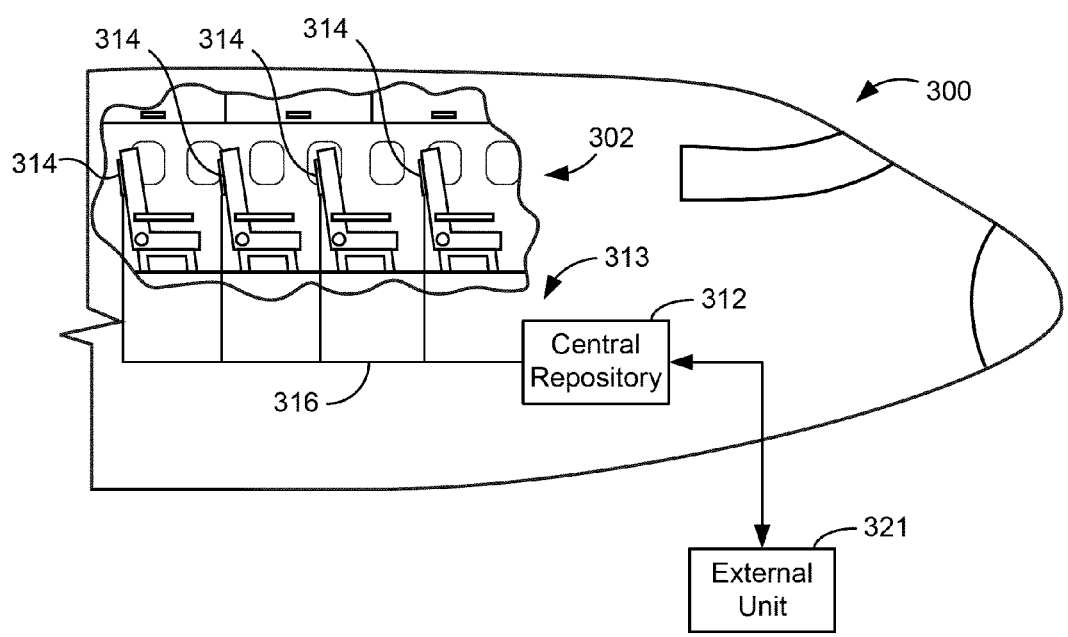
FIG. 3 is a diagram of a portion of an aircraft with an in-flight entertainment system including a head end and seat entertainment units according to an exemplary embodiment.

The target units 14, 16, 18, 20, 22 and 24 include internal storage 144, 146, 148, 150, 152 and 154, respectively, in some embodiments. The internal storage 144, 146, 148, 150, 152 and 154 stores assets associated with the database 25 in some embodiments. The internal storage 142, 144, 146, 148, 150, 152 and 154 is any type of memory, drive, or combination for storing electronic files in some embodiments With reference to FIG. 3, the principles of the distribution systems 10 and 100 can be utilized on an aircraft 300 in an in-flight entertainment system 302. The in-flight entertainment system 302 includes a network 313 having a head end or central repository 312, similar to the central repository 12 (FIGS. 1-2) and seat entertainment units 314 which can be similar to the target units 14, 16, 18, 20, 22 and 24 (FIGS. 1-2). A network bus 316 can connect the central repository 312 to the seat entertainment units 314 in some embodiments. Alternatively, the network 313 for the in-flight entertainment system 302 can be a wireless entertainment network. The external source 321 can be similar to the external storage unit 21 or to the remote server 27 (FIGS. 1-2)

With reference to FIG. 4, the seat entertainment unit 314 includes a communication unit 370, a user interface 374, an audio circuit 366, a display 362, a storage unit 344 similar to the storage units 144, 146, 148, 150, 152, 154 (FIG. 2), and a processor 360 in some embodiments. The user interface 374 is a set of buttons, a touch screen, a mouse, a joystick, a BLUETOOTH interface, combinations thereof, etc. in some embodiments. The user interface 374 can be any device for receiving signals from a user. The audio circuit 366 includes a speaker and/or headphone jack in some embodiments.

The processor 360 is a microprocessor, display processor, audio processor, media processor, combinations thereof, or other processor for providing content stored in the storage unit 344 for playback on the display 362 and the audio circuit 366 in some embodiments. In addition, the processor 360 can provide an interface for communicating with the network 13 (e.g., for receiving content on network 313 (via communication unit 370). The processor 360 can also control the storage functions on the storage unit 344 in response to commands from the central repository 12 or in response to analysis of content on the storage unit 344 and metadata.

The storage unit 344 can be any type of storage including DRAM, SRAM, hard disc drives, flash drives, etc. The communication unit 370 can be a network card or other device for communication on the bus 316 or wirelessly in some embodiments.

The display 362 can have various shapes and sizes. In some embodiments, the display 362 includes a liquid crystal display (LCD) a monitor that is provided in a seat back. In some embodiments, the passenger can have a personal electronic device (e.g., a smartphone, tablet, laptop computer, portable gaming device, portable computing device) onboard the aircraft and can connect to the internal storage unit 344 or the processor 360 to access content, assets or files (e.g., movies, music, games, books). According to some embodiments, the display 362 is a touch screen display that allows users to interact with the entertainment system through touching the screen of the display 362 with a displayed item.

With reference to FIG. 5, a representation 500 shows content including assets 1, 2, 3, 4, 5, 6, 7 stored on the central repository 12, the external storage unit 21 and the target unit 24. Although seven assets are shown in FIG. 5, any number of assets can be utilized. Representation 500 is a Venn diagram showing assets 1, 4, 5 and 7 stored on the external storage unit 21 in a circle 502, showing assets 2, 5, 6, and 7 stored on the target unit 24 in a circle 504, and assets on 3, 4, 6, and 7 stored on central repository 12 in a circle 506. A number of circles 504 can be utilized to represent each target unit 14, 16, 18, 20, 22 and 24; however, only content for one target unit is shown in single circle 504 for simplicity in FIG. 5.

Systems 10, 100 and 300 operate to distribute and align the content on the external storage unit 21 (e.g., circle 502) with the content in the target unit 24 or the seat entertainment unit 314 (e.g., circle 504) and the central repository 12 or 312 (e.g., circle 506) in some embodiments. The external storage unit 21 includes assets 1, 5, 4 and 7 which may be located on the central repository 12 and the target units 14, 16, 18, 20, 22 and 24 after distribution in some embodiments. Before distribution, the target unit 24 or the seat entertainment unit 314 includes assets 2, 5, 6, and 7 and the central repository 12 or 312 includes assets 3, 4, 6, and 7 according to one example. Operations are described below with respect to the system 10 for simplicity and are applicable to the systems 100 and 300 in some embodiments.

In some embodiments, the distribution system and method performs operations to ensure that assets 1, 4, 5 and 7 are present on both the central repository 12 and the target units 14, 16, 18, 20, 22 and 24. As shown by circle 506, the central repository 12 already includes assets 4 and 7 and includes additional assets 3 and 6 which are to be removed from the central repository 12 so that the content of the central repository 12 matches the content of the external storage unit 21. The target unit 24 includes assets 7, 5, 6 and 2. Accordingly, assets 6 and 2 are to be removed and assets 1 and 4 are be added to assimilate the content of the target units 24 with the external storage unit 21.

The system 10 can efficiently control distribution of content in the network 13. For example, the system 10 achieves exact matching of content from the unit 21 to content in the central repository 12 and the units 14, 16, 18, 20, 22 and 24 with minimal steps. For example, sending of asset 7 to the target unit 24 is not required. Further, the central repository 12 does not unnecessarily send assets to the target unit 24 that are stored on central repository 12 (e.g., assets 7) in some embodiments. Although the central repository 12 unnecessarily sends assets that are already on target unit 24 and that were not on central repository 12 (e.g., asset 5), this occurrence is relatively minor as the content of the central repository 12 is usually matched with the content of the target units 14, 16, 18, 20, 22 and 24 according to some embodiments.

With reference to FIG. 6, a representation 600 shows content (assets 1, 4, 5, and 7) properly aligned on the external storage unit 21, the central repository 12 and the target unit 24 as represented by circles 502, 504, and 506. Representation 600 is a Venn diagram. With reference to FIG. 7, a representation 700 shows content including assets 1, 5, and 7 on the external storage unit 21, the central repository 12 and the target unit 24. Asset 4 is included on the central repository 12 and the external storage unit 21 and not on the target unit 24, and asset 2 is located only on the central repository 12. Such a content distribution is not aligned as shown in the representation 700. To align content, asset 4 is to be provided to the target unit 24, and asset 2 is to be removed from the central repository 12 in some embodiments. Representation 700 is a Venn diagram.

Figure 8:
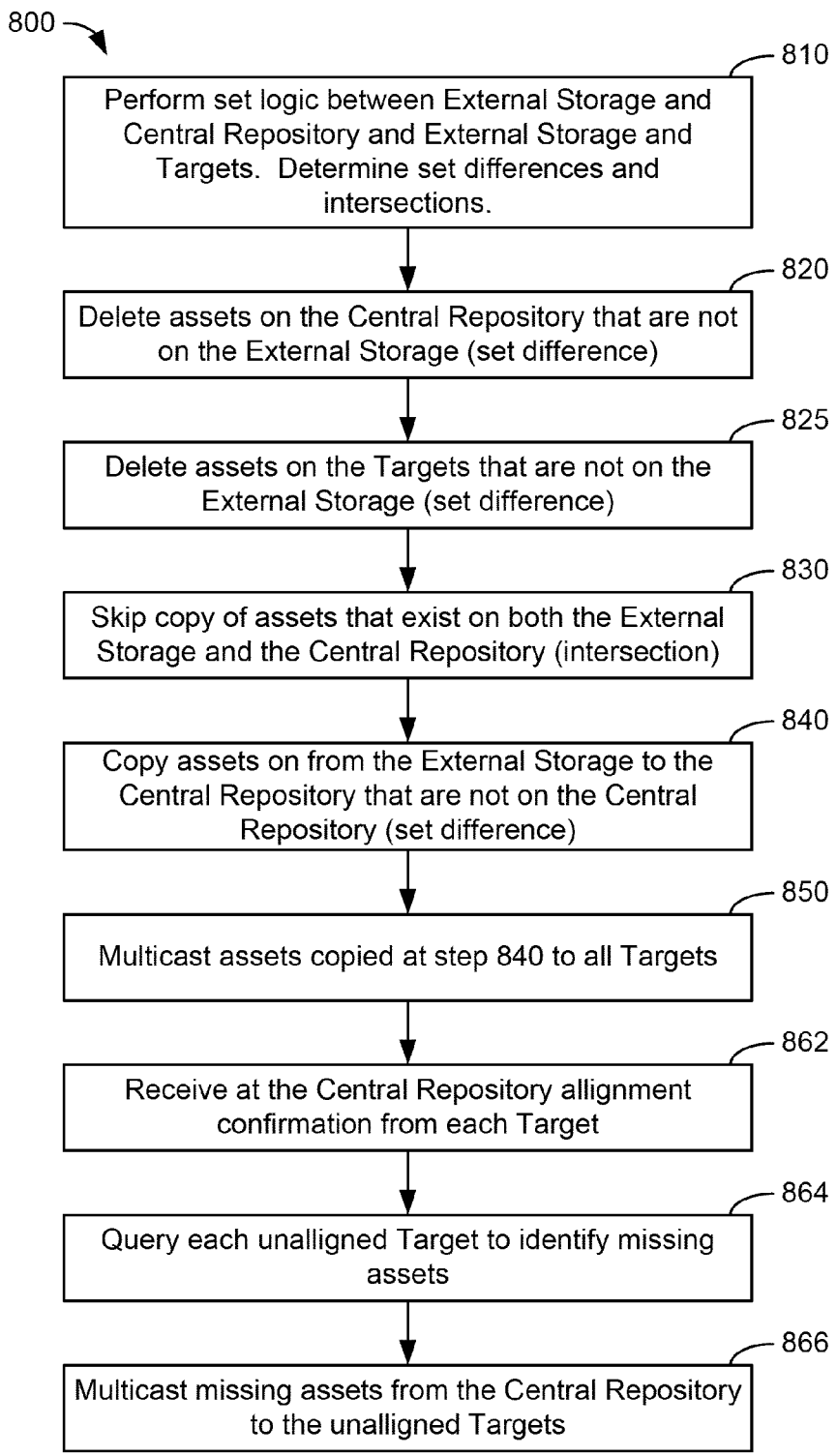
FIG. 8 is a flow diagram of a process for distributing content according to an exemplary embodiment.

With reference to FIGS. 5 and 8, the distribution system 10, 100 or 300 operates according to a flow diagram 800 to assimilate content (e.g., the assets of the unit 21 with the assets of the network 13). Flow diagram 800 is described below with reference to the system 10 and FIG. 1 for simplicity. However, flow 800 is performed by the system 300 or the system 100 in some embodiments.

At an operation 810, the system 10 determines the asset universe or the content universe and determines that assets 1, 2, 3, 4, 5, 6 and 7 are stored on the external storage unit 21, the central repository 12, and the target units 14, 16, 18, 20, 22 and 24. Operation 810 can be performed by the central repository 12 (e.g., the content distribution module 17) using a query of metadata associated with the storage of content on the external storage unit 21, the central repository 12, and the target units 14, 16, 18, 20, 22 and 24.

At an operation 820, the system 10 deletes the content difference between the external storage unit 21 and the central repository 12 (e.g. deletes assets 3 and 6). Operation 820 can be performed by content distribution module executed on central repository. At an operation 825, system 10 deletes the content difference between the external storage unit 21 and the target units 14, 16, 18, 20, 22 and 24 (e.g. deletes assets 2 and 6) according to some embodiments. Operation 825 can be performed by the content distribution module 17 executed on each of the target units 14, 16, 18, 20, 22 and 24.

At an operation 830, the system 10 determines that assets 4 and 7 are located on both the central repository 12 and the external storage unit 21. At an operation 830, the system 10 determines a difference between the content on the external storage unit 21 and the central repository 12 after the deletion in operation 820 and determines that assets 1 and 5 are needed on the central repository 12 according to some embodiments. At an operation 840, assets 1 and 5 are copied to the central repository 12. In some embodiments, the central repository 12 or system 10 simultaneously multicasts assets 1 and 5 to target units 14, 16, 18, 20, 22 and 24 in operation 850. After operation 840, the central repository 12 has the same assets as the external storage unit 21 according to some embodiments.

At an operation 864, synchronization is performed utilizing a database query. The database query reveals that asset 4 is missing from the target unit 24, and asset 4 is multicast out to target 24 and any other targets that need asset 4 in some embodiments. The database query can use a comparison of metadata associated with central repository 12 and target units 14, 16, 18, 20, 22 and 24 or with external storage unit 21 and target units 14, 16, 18, 20, 22 and 24. The multicast is applied to all of the target units 14, 16, 18, 20, 22 and 24 or subsets of the target units 14, 16, 18, 20, 22 and 24 requiring the missing asset in some embodiments.

Figure 9:
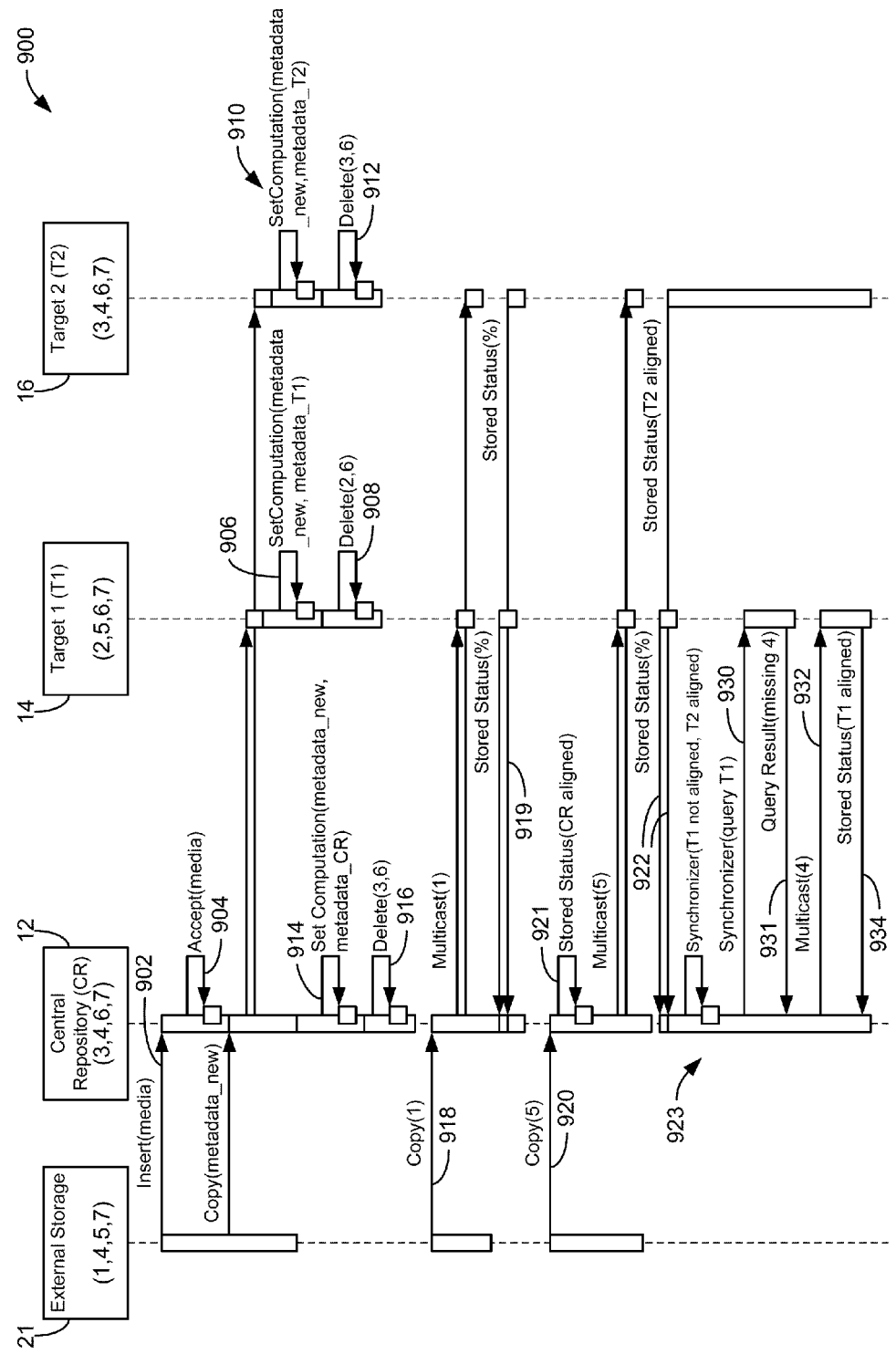
FIG. 9 is a sequence diagram of a process for distributing content according to an exemplary embodiment.

With reference to FIG. 9, a sequence diagram 900 shows exemplary distribution operations and timing of the system 10 according to some embodiments. Sequence diagram 900 can be used with the systems 100 or 300 without departing from the scope of the embodiments. In this exemplary operation, the content of the external storage unit 21 includes assets 1, 4, 5, and 7, central repository 12 includes assets 3, 4, 6, and 7, the target unit 14 includes asset 2, 5, 6, 7, and the target unit 16 includes assets 3, 4, 6 7 prior to distribution (e.g., Content Sets: external storage unit 21—X={1,4,5,7}; central repository 12—C={3,4,6,7}; target unit 14—T1={2,5,6,7}, target unit 16—T2={3,4,6,7}; and Content Universe—X U C U T1 U T2={1,2,3,4,5,6,7}.

Media associated with the external storage unit 21 is inserted into the central repository 12 and accepted by the central repository at an operation 902. The insertion can be by wireless connection or a wired connection. The content of the external storage unit 21 can include assets 1,4,5,7 as represented by metadata (e.g., metadata_new. The external storage unit 21 provides metadata_new (e.g., identifying assets 1,4, 5,7) at an operation 904 to the central repository 12 and the target units 14 and 16.

At an operation 906, the target unit 14 compares the received metadata to its own content (e.g., metadata of target unit 14) to determine which assets are to be deleted from the target unit 14 in some embodiments At an operation 908, the target unit 14 deletes assets 2 and 6 in response to the comparison (e.g., delete set difference T1\X). At an operation 910, the target unit 16 compares the received metadata to its own content e.g., metadata of target unit 16) to determine which assets should be deleted from the target unit 16. In operation 912, assets 3 and 6 are deleted (e.g., delete set difference T2\X). Operations 906, 908, 910 and 912 can be performed by the central repository 12 or by the target units 14 and 16 in some embodiments. A command from the central repository 12 can be used to implement operations 908 and 912 in some embodiments.

At an operation 914, the central repository 12 determines which assets are to be deleted by comparing metadata to its own content (metadata of central repository 12). At an operation 916, the central repository 12 deletes assets 3 and 6 in some embodiments (e.g., delete set difference C\X).

Operations 906, 910 and 914 can be performed simultaneously with each other in some embodiments. Similarly, operations 908, 912 and 916 can be performed simultaneously with respect to each other in some embodiments. Before operation 918, target unit 14 requires the set difference of X and T1 (e.g., X\T1—assets 1 and 4) and does not require the intersection of X and T1 (e.g., X n T1—assets 5 and 7) in some embodiments. Before operation 918, target unit 16 requires the set difference of X and T2 (e.g., X\T2—assets 1 and 5) and does not require the intersection of X and T2 (e.g., X n T2—assets 4 and 7) in some embodiments.

At an operation 918, asset 1 is copied to the central repository 12 and simultaneously multicast to the target unit 14 and the target unit 16. Assets in the intersection of X and C (e.g., X n C—assets 4 and 7) are not transferred in operation 918 in some embodiments. At an operation 919, the target units 14 and 16 provide an indication of the storage status with respect to the target units 14 and 16. The target units 14 and 16 have not reached full alignment.

At an operation 920, asset 5 is copied to the central repository 12 and simultaneously multicast to the target unit 14 and the target unit 16. Assets in the intersection of X and C (e.g., X n C—assets 4 and 7) are not transferred in operation 920 in some embodiments. Accordingly, operations 918 and 920 copy the set difference of X and C (e.g., X\C—assets 1 and 5) in some embodiments. Target unit 14 receives asset 5 even though it already contains asset 5 in some embodiments.

At an operation 922, target units 14 and 16 provide an indication of the storage status with respect to the target units 14 and 16. The target unit 16 has received all the necessary assets while target unit 14 is missing an asset (e.g., asset 4). At an operation 921, central repository 12 indicates that it is aligned now having assets 1, 4, 5, and 7.

At an operation 923, synchronization is performed and the target unit 16 indicates that it includes assets 1, 4, 5, and 7 and is therefore 100 percent aligned and the target unit 14 indicates that it is not aligned. Accordingly, the target unit 16 does not need additional contents to be aligned with the central repository 12 and the external storage unit 21, while the target unit 14 does. At an operation 930, the target unit 14 indicates that it is missing asset 4 in response to a query from the central repository 12. The query result is that asset 4 which is missing from the target unit 14 and is provided to the central repository 12 In response to the query result, central repository 12 multicasts asset 4 in an operation 932. In an operation 934, the target unit 14 indicates that its storage status is 100 percent and it is aligned with the central repository 12 in accordance with some embodiments.

The operations described herein of the systems 10, 100 and 300 can be performed by a number of units within the systems 10, 100, 300. In some embodiments, the central repository 12 can include the processing storage and communication circuits to effect the copying, distribution and communication of the assets as well as tracking of storage status. The central repository 12 can include server logic in other software modules for performing the communication and tracking tasks associated with the system 10. In addition, the central repository 12 or the system 10 can include software modules for performing the set comparison computations as described herein.

While the detailed drawings, specific examples, and particular configurations given describe preferred and exemplary embodiments, they serve the purpose of illustration only. The inventions disclosed are not limited to the specific forms shown. For example, methods described may be performed in any of a variety of sequence of steps or according to any of a variety of mathematical formulas. The systems and methods depicted and described are not limited to the precise details and conditions disclosed. The flow charts and diagrams show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A content distribution system for ensuring that total distribution content stored on a remote source matches content stored at a head end and a plurality of target units, the content distribution system comprising:
   a non-transitory memory at the head end; and
   a content distribution server configured to determine first content being part of the total distribution content stored in the remote source and is not stored in the non-transitory memory of the head end using set logic and configured to copy the first content to the head end and to the target units in a multicast operation, wherein second content stored in the non-transitory memory of the head end and being part of the total distribution content stored in the remote source before the multicast operation is not provided to the target units during multicast operation, wherein third content stored in the non-transitory memory of the head end and not part of the total distribution content stored in the remote source before the multicast operation is determined and deleted from the non-transitory memory, wherein fourth content stored in one of the target units and not part of the total distribution content stored in the remote source before the multicast operation is determined and deleted from one of the targets, wherein fifth content stored in the non-transitory memory of the head end and being part of the universal distribution content stored the remote source before the multicast operation and not being stored on another of the target units is determined and provided to the another of the target units.

2. The content distribution system of claim 1, wherein the content distribution server is configured to receive metadata of identification of the total distribution content stored on the remote source and to compare the metadata to identification of the content stored at the head end to determine identification of the first content.

3. The content distribution system of claim 2, wherein the content distribution server comprises a module comprising software operating on a computer platform.

4. The content distribution system of claim 3, wherein the content distribution server is configured to to multicast the first content to the target units simultaneously with copying the first content to the head end.

5. The content distribution system of claim 1, wherein the head end and target units are part of an in-flight entertainment system.

6. The content distribution system of claim 5, wherein the target units are in-seat entertainment units.

7. The content distribution system of claim 4, wherein the content distribution module is configured to receive metadata of identification of the total distribution content stored on the remote source and compares the metadata to identification of content stored at the head end to determine identification of the first content, and deletes third content not identified in the identification of the content stored on the remote source and stored on the head end.

8. The content distribution system of claim 7, wherein the content distribution module is configured to receive metadata for identification of the content stored on the remote source and compares the metadata to identification of content stored at the head end to determine identification of the first content.

9. The content distribution system of claim 8, wherein the content distribution module uses an alignment query to determine existence of the fifth content.

10. The content distribution system of claim 8, wherein the content distribution module is configured to receive status information associated with the content stored on at least one of the target units after the first content is copied to the memory and provided to at least one target unit and the content distribution module is configured to determine if needed content is required by at least one target unit.

11. An in-flight entertainment system for receiving remote content from a remote source, the remote content comprising a first asset, a second asset, and a third asset, the in-flight entertainment system comprising:
    a central repository comprising a router and a first memory, wherein the first memory stores central content comprising the third asset and a fourth asset;
    a plurality of in-seat entertainment units in communication with the router and each comprising a respective memory, wherein the respective memory stores the fourth asset and a fifth asset; and
    wherein the central repository is configured to delete the fourth asset in the first memory in response to a comparison of identification of the remote content to identification of the central content and the fourth asset and the fifth asset in each respective memory in response to a comparison of identification of the remote content to identification of the central content, copy the first asset and the second asset to the first memory and each respective memory of the in-seat entertainment units in a multicast operation, wherein the third asset and the fourth asset is not copied to the respective memory during the multicast to the in-seat entertainment units.

12. The in-flight entertainment system of claim 10, wherein the in-flight entertainment system uses set logic to delete and copy.

13. The in-flight entertainment system of claim 10, wherein the router is configured to multicast the first asset and the second asset when copying the first asset and the second asset to the first memory.

14. The in-flight entertainment system of claim 10, wherein metadata identifies the first asset, the second asset and the third asset and is used for the comparison.

15. The in-flight entertainment system of claim 13, wherein the meta-data comprises metadata unique addresses associated with media content.

16. The method claim 15, further comprising:
    synchronizing target units missing an asset of the remote content stored on the remote source.

17. The method of claim 15, further comprising deleting third assets in a target unit, the third assets not being present in the remote content in response to a metadata comparison.

18. The method of claim 15, further comprises deleting a sixth asset on a selected target unit of the target units.

19. The method of claim 17, wherein the multicast operation is simultaneous with the adding of the second assets.

* * * * *